United States Patent
Hsu et al.

(10) Patent No.: US 10,416,533 B2
(45) Date of Patent: Sep. 17, 2019

(54) LENS DRIVING MECHANISM AND ELECTRONIC DEVICE HAVING THE SAME

(71) Applicant: TDK TAIWAN CORP., Yangmei Taoyuan (TW)

(72) Inventors: Shang-Yu Hsu, Yangmei Taoyuan (TW); Shou-Jen Liu, Yangmei Taoyuan (TW); Chia-Pin Hsu, Yangmei Taoyuan (TW)

(73) Assignee: TDK Taiwan Corp., Yangmei Toyuan (TW)

( * ) Notice: Subject to any disclaimer, the term of this patent is extended or adjusted under 35 U.S.C. 154(b) by 0 days.

(21) Appl. No.: 15/590,395

(22) Filed: May 9, 2017

(65) Prior Publication Data
US 2018/0017842 A1 Jan. 18, 2018

Related U.S. Application Data

(60) Provisional application No. 62/363,450, filed on Jul. 18, 2016.

(30) Foreign Application Priority Data

Feb. 22, 2017 (CN) .......................... 2017 1 0096738

(51) Int. Cl.
*H04N 5/225* (2006.01)
*H04N 5/232* (2006.01)
(Continued)

(52) U.S. Cl.
CPC ................. *G03B 7/10* (2013.01); *G03B 3/10* (2013.01); *G03B 7/08* (2013.01); *G03B 17/12* (2013.01); *G03B 13/36* (2013.01); *G03B 29/00* (2013.01); *G03B 2205/0053* (2013.01); *H04N 5/2254* (2013.01); *H04N 5/23296* (2013.01)

(58) Field of Classification Search
CPC . G03B 7/10; G03B 7/08; G03B 13/36; G03B 29/00; H04N 5/23296; H04N 5/2254; G02B 27/646; G02B 7/08
See application file for complete search history.

(56) References Cited

U.S. PATENT DOCUMENTS

| 7,991,279 B2 * | 8/2011 | Chiang | G02B 27/646 396/55 |
| 2009/0251808 A1 * | 10/2009 | Higuchi | G02B 7/08 359/823 |

(Continued)

FOREIGN PATENT DOCUMENTS

CN 204790139 U 11/2015

*Primary Examiner* — Roberto Velez
*Assistant Examiner* — Tuan H Le
(74) *Attorney, Agent, or Firm* — Muncy, Geissler, Olds & Lowe, P.C.

(57) ABSTRACT

A lens driving mechanism is provided for moving a lens unit along a light axis, including a frame, a base, a lens holder, and a driving assembly. The frame has plastic material and forms an opening. The base is in contact with and fixed to the frame, wherein a space is formed between the base and the frame. The lens holder is movably disposed in the space for holding the lens unit, wherein an external light enters the space through the opening to the lens unit. The driving assembly is disposed in the space and is connected to the lens holder and the frame, to impel the lens unit to move along the light axis.

14 Claims, 8 Drawing Sheets

(51) Int. Cl.
*G03B 7/10* (2006.01)
*G03B 7/08* (2014.01)
*G03B 3/10* (2006.01)
*G03B 17/12* (2006.01)
G03B 13/36 (2006.01)
G03B 29/00 (2006.01)

(56) References Cited

U.S. PATENT DOCUMENTS

| | | | |
|---|---|---|---|
| 2010/0157137 A1* | 6/2010 | Imai | G02B 7/02 |
| | | | 348/362 |
| 2011/0102920 A1* | 5/2011 | Shyu | G02B 7/08 |
| | | | 359/823 |
| 2012/0002102 A1* | 1/2012 | Sekimoto | G02B 7/022 |
| | | | 348/374 |
| 2012/0294602 A1* | 11/2012 | Sekine | H01L 27/14618 |
| | | | 396/502 |
| 2014/0192260 A1* | 7/2014 | Oh | H04N 5/2251 |
| | | | 348/374 |
| 2016/0006920 A1* | 1/2016 | Gomes Da Motta | ......... |
| | | | H04N 5/23203 |
| | | | 348/207.11 |
| 2016/0088198 A1* | 3/2016 | An | H04N 5/2252 |
| | | | 348/374 |
| 2016/0178924 A1* | 6/2016 | Lim | G02B 7/08 |
| | | | 359/557 |

* cited by examiner

LENS DRIVING MECHANISM AND ELECTRONIC DEVICE HAVING THE SAME

CROSS REFERENCE TO RELATED APPLICATIONS

This Application claims priority claims priority of provisional U.S. Patent Application Ser. No. 62/363,450 filed on Jul. 18, 2016 and China Patent Application No. 201710096738.6 filed on Feb. 22, 2017, the entirety of which is incorporated by reference herein.

BACKGROUND OF THE DISCLOSURE

Field of the Invention

The present invention relates to a lens driving mechanism, and more particularly to a lens driving mechanism having a frame comprising plastic material.

Description of the Related Art

Conventional cell phones or tablet computers usually have a camera lens module which includes a lens unit and a lens driving mechanism such as voice coil motor (VCM). A driving assembly including magnets and coils is usually provided for moving the lens unit in the lens driving mechanism along a light axis thereof, so as to facilitate auto-focusing of the camera.

FIG. 1A shows a conventional voice coil motor 10 connected to a transparent plate G and a circuit board P, and FIG. 1B is a cross-sectional view along line A-A in FIG. 1A. Referring to FIGS. 1A and 1B, a frame 11 of the voice coil motor 10 is assembled to a base 13, and a lens holder 12 is disposed in a space 101 formed by the frame 11 and the base 13. An upper spring sheet S1 connects the frame 11 to the lens holder 12, and the lower spring sheet S2 connects the base 13 to the lens holder 12, so that the lens holder 12 and a lens unit (not shown) received therein can be moved relative to the frame 11 and the base 13 along a light axis thereof by the voice coil motor 10. Specifically, the transparent plate G is adhered to a top surface 111 of the frame 11, so as to protect the lens unit and other components received in the voice coil motor 10 and allow light to enter the voice coil motor 10 through the transparent plate G.

However, as the frame 11 of the voice coil motor 10 is usually formed by stamping a metal plate which may comprise magnetically conductive material, and miniaturization of the portable electronic devices has become an increasing trend, the communication element (such as antenna or wireless communication chip) in the electronic device can be adversely influenced by the metal frame 11 and result in poor performance by the electronic device. Additionally, since the upper spring sheet S1 is a flat and thin component, four depressed structures 112 (FIGS. 1A and 1B) are usually formed on the metal frame 11, so that the upper spring sheet S1 can be connected much easier to the upper surface of the lens holder 12 and the depressed structure 112 (FIG. 1B). In this configuration, the adhesion area between the top surface 111 and the transparent plate G can be reduced, and the structural strength of the mechanism can also be reduced after assembly.

BRIEF SUMMARY OF THE DISCLOSURE

Accordingly, one objective of the present invention is to provide a lens driving mechanism for moving a lens unit along a light axis. The lens driving mechanism includes a frame, a base, a lens holder, and a driving assembly. The frame comprises plastic and has an opening. The base is in contact with and fixed to the frame, wherein a space is formed between the base and the frame. The lens holder is movably disposed in the space for holding the lens unit, wherein an external light enters the space through the opening to the lens unit. The driving assembly is disposed in the space and is connected to the lens holder and the frame, to impel the lens unit along the light axis.

According to some embodiments of the disclosure, the frame further has a protrusion, a top surface, and a side surface extended from an edge of the top surface and toward the base, wherein the protrusion protrudes from an inner surface of the frame and corresponding to an adjoining area between the top and side surfaces, to enhance the structural strength of the frame.

According to some embodiments of the disclosure, the top surface has a quadrangular shape.

According to some embodiments of the disclosure, the frame comprises metal.

According to some embodiments of the disclosure, the lens driving mechanism further comprises a conductive wire directly formed on/in the frame by Molded Interconnect Device (MID) technology.

According to some embodiments of the disclosure, the driving assembly includes a first magnetic element and a second magnetic element respectively disposed on the frame and the lens holder, and the lens holder is moved relative to the frame and the base by magnetic force generated between the first and second magnetic elements.

According to some embodiments of the disclosure, the frame further has a holding portion protruding from an inner surface of the frame and restricting the first magnetic element in a predetermined position on the inner surface.

According to some embodiments of the disclosure, the holding portion forms a U-shaped structure with the first magnetic element disposed therein.

According to some embodiments of the disclosure, the first magnetic element comprises a multipolar magnet.

According to some embodiments of the disclosure, the first magnetic element comprises a magnet, and the second magnetic element comprises a coil with an electrical current applied thereto.

According to some embodiments of the disclosure, the lens holder has a protruding slider, and the frame further has a restricting structure with the slider received therein to restrict movement of the slider.

According to some embodiments of the disclosure, the restricting structure has two restricting portions protruding from an inner surface of the frame, and a recess is formed between the two restricting portions and extended along the light axis, wherein the width of the recess exceeds that of the slider.

According to some embodiments of the disclosure, the lens driving mechanism has a substantially polygonal structure and further comprises two driving assemblies disposed on opposite sides thereof to move the lens unit along the light axis, wherein the slider and the restricting structure are situated on a side of the lens driving mechanism different from the driving assemblies.

According to some embodiments of the disclosure, the frame forms a quadrangular shape and further has a plastic main body and a metal plate, the opening is formed on the main body, and the metal plate is disposed on a side of the main body.

According to some embodiments of the disclosure, the metal plate forms a plurality of holes, and the main body forms a plurality of protruding portions engaged in the holes.

Another objective of the present invention is to provide an electronic device. The electronic device comprises the aforementioned lens driving mechanism, a housing, and a wireless communicating element. The lens driving mechanism has a substantially polygonal structure, and the lens driving mechanism and the wireless communicating element are disposed in the housing. The driving assembly is adjacent to a first side of the lens driving mechanism, and the wireless communicating element is adjacent to a second side of the lens driving mechanism, different from the first side.

BRIEF DESCRIPTION OF THE DRAWINGS

For a more complete understanding of the embodiments, and the advantages thereof, reference is now made to the following descriptions taken in conjunction with the accompanying drawings.

DETAILED DESCRIPTION OF THE ILLUSTRATIVE EMBODIMENTS

While the invention has been described in connection with various aspects, it should be understood that the invention is capable of further modifications. This application is intended to cover any variations, uses or adaptation of the invention following, in general, the principles of the invention, including such departures from the present disclosure as come within the known and customary practice within the art to which the invention pertains.

In the following detailed description of the preferred embodiments, reference is made to the accompanying drawings, and in which specific embodiments of which the invention may be practiced are shown by way of illustration. In this regard, directional terminology, such as "top," "bottom," "front," "back," etc., is used with reference to the orientation of the figures being described. The components of the present invention can be positioned in a number of different orientations. As such, the directional terminology is used for the purposes of illustration and is in no way limiting.

Figure 1A:
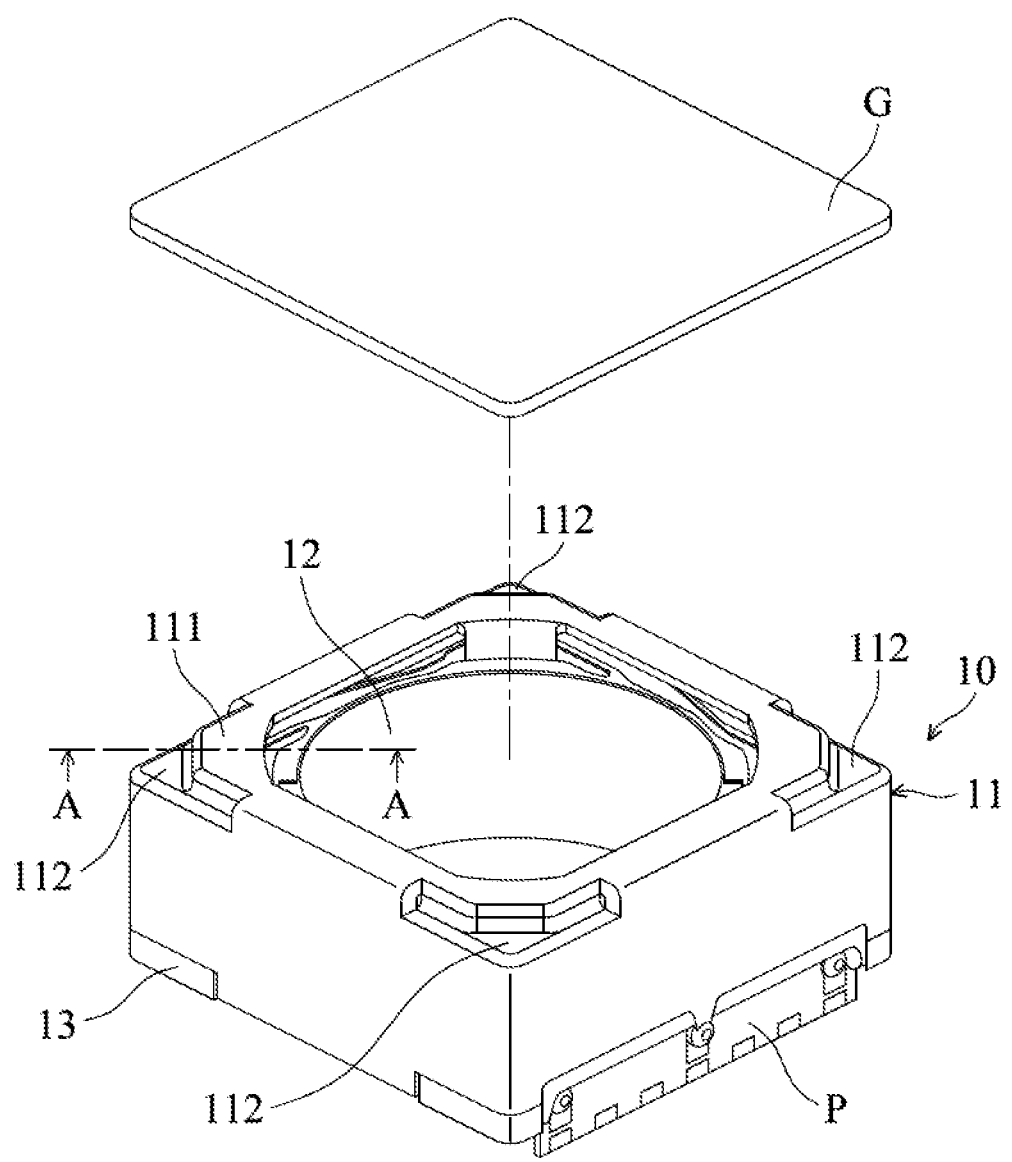
FIG. 1A shows a conventional voice coil motor connected to a transparent plate G and a circuit board P.
Figure 1B:
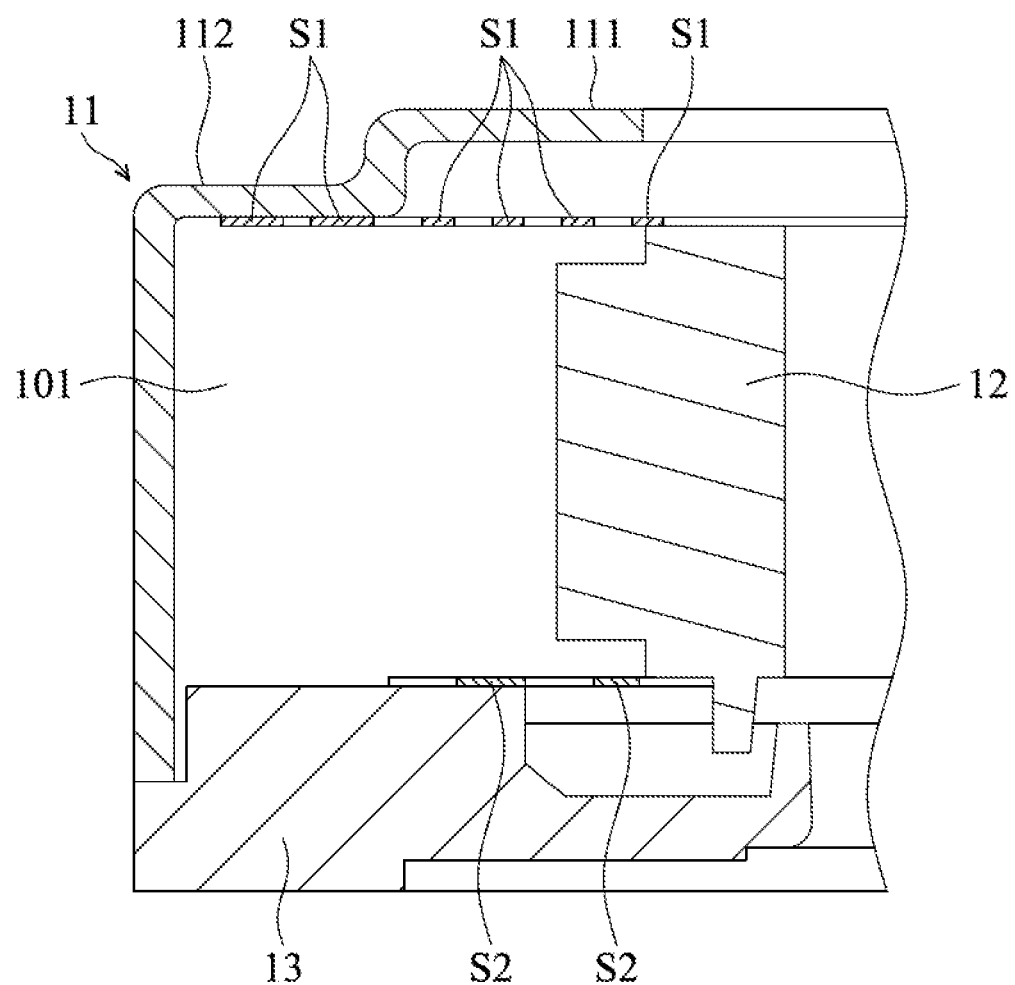
FIG. 1B is a cross-sectional view along line A-A in FIG. 1A.
Figure 2:
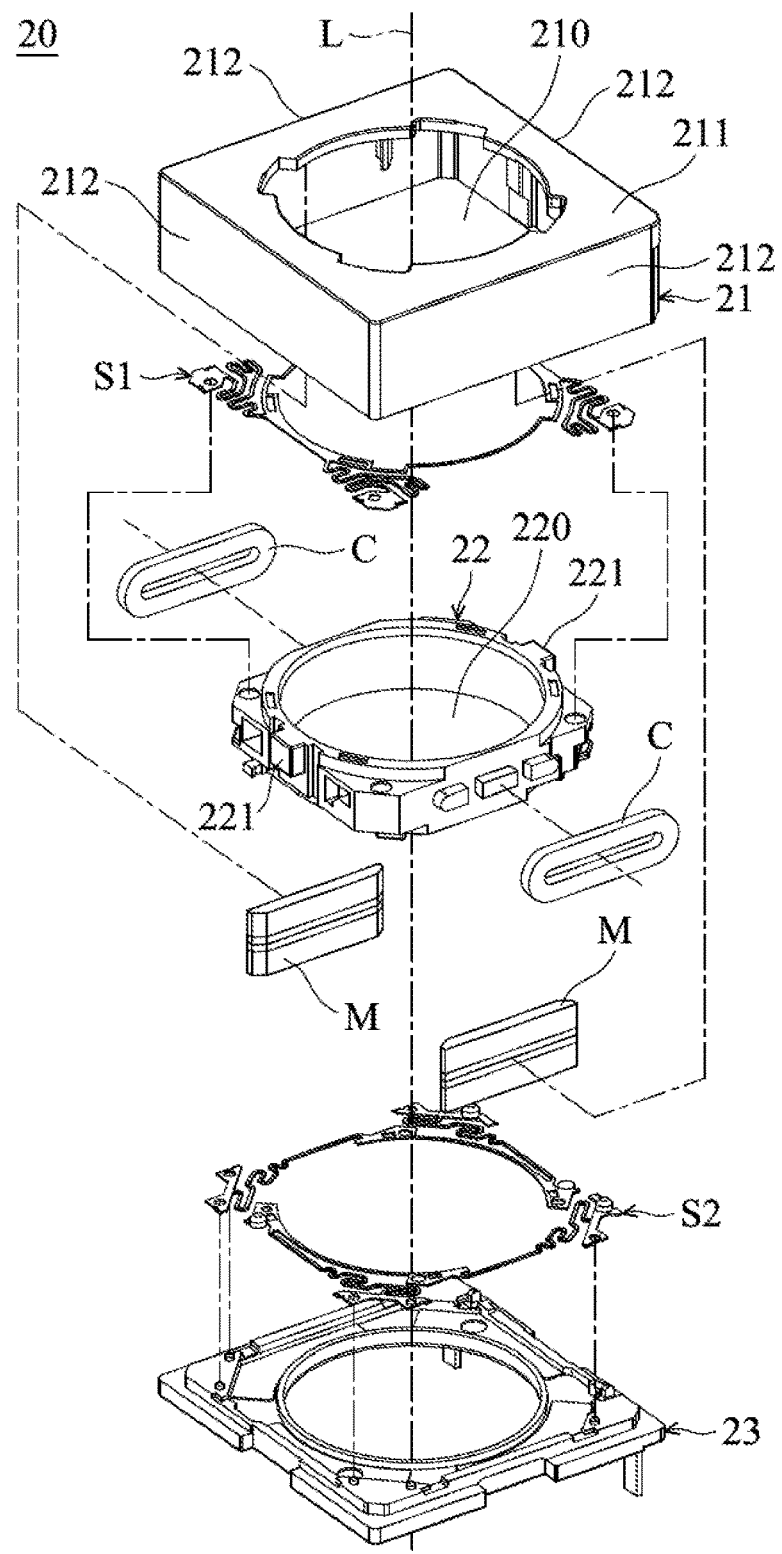
FIG. 2 is an exploded diagram of a lens driving mechanism 20 according to an embodiment of the invention.

FIG. 2 is an exploded diagram of a lens driving mechanism 20 according to an embodiment of the invention. As shown in FIG. 2, the lens driving mechanism 20 is provided for holding a lens unit (not shown), wherein a driving assembly having magnets and coils is disposed in the driving mechanism 20 to force the lens unit to move along the light axis L of the lens unit, so as to achieve auto focusing of a camera.

The lens driving mechanism 20 primarily comprises a frame 21, a lens holder 22, a base 23, an upper spring sheet S1, a lower spring sheet S2, at least a first magnetic element M, and at least a second magnetic element C. The frame 21 has a substantially quadrangular structure and forms an opening 210. Four side surfaces 212 are extended from a top surface 211 of the frame 21 toward the base 23. The base 23 is fixed to and in contact with the frame 21, and the lens holder 22 is movably disposed between the base 23 and the frame 21. The lens holder 22 has a through hole 220 for receiving and holding the lens unit (not shown). It should be noted that external light can enter the lens driving mechanism 20 via the opening 210 of the frame 21, sequentially propagate through the lens unit at the center of the lens holder 22 and the base 23, and finally reach an image sensor (such as CCD) to generate an image.

As depicted in FIG. 2, the first magnetic elements M are disposed on the inner surfaces of the frame 21, and the second magnetic elements C are disposed on the outer surfaces of the lens holder 22, corresponding to the first magnetic elements M. In this embodiment, the first magnetic elements M may comprise bi-polar or multipolar magnets, and the second magnetic elements C may comprise coils. To move the lens unit along the light axis L, an electrical current can be applied to the second magnetic elements C, and the magnetic fields generated by the second magnetic elements C can interact with those of the first magnetic elements M to generate a magnetic force. Thus, the lens unit can be controlled and moved along the light axis L by the magnetic force to achieve rapid focusing and OIS (Optical Image Stabilization). In some embodiments, the first magnetic elements M can be coils, and the second magnetic elements C can be bi-polar or multipolar magnets corresponding to the coils, so that the lens unit can also be controlled and moved along the light axis L by magnetic force.

Figure 3A:
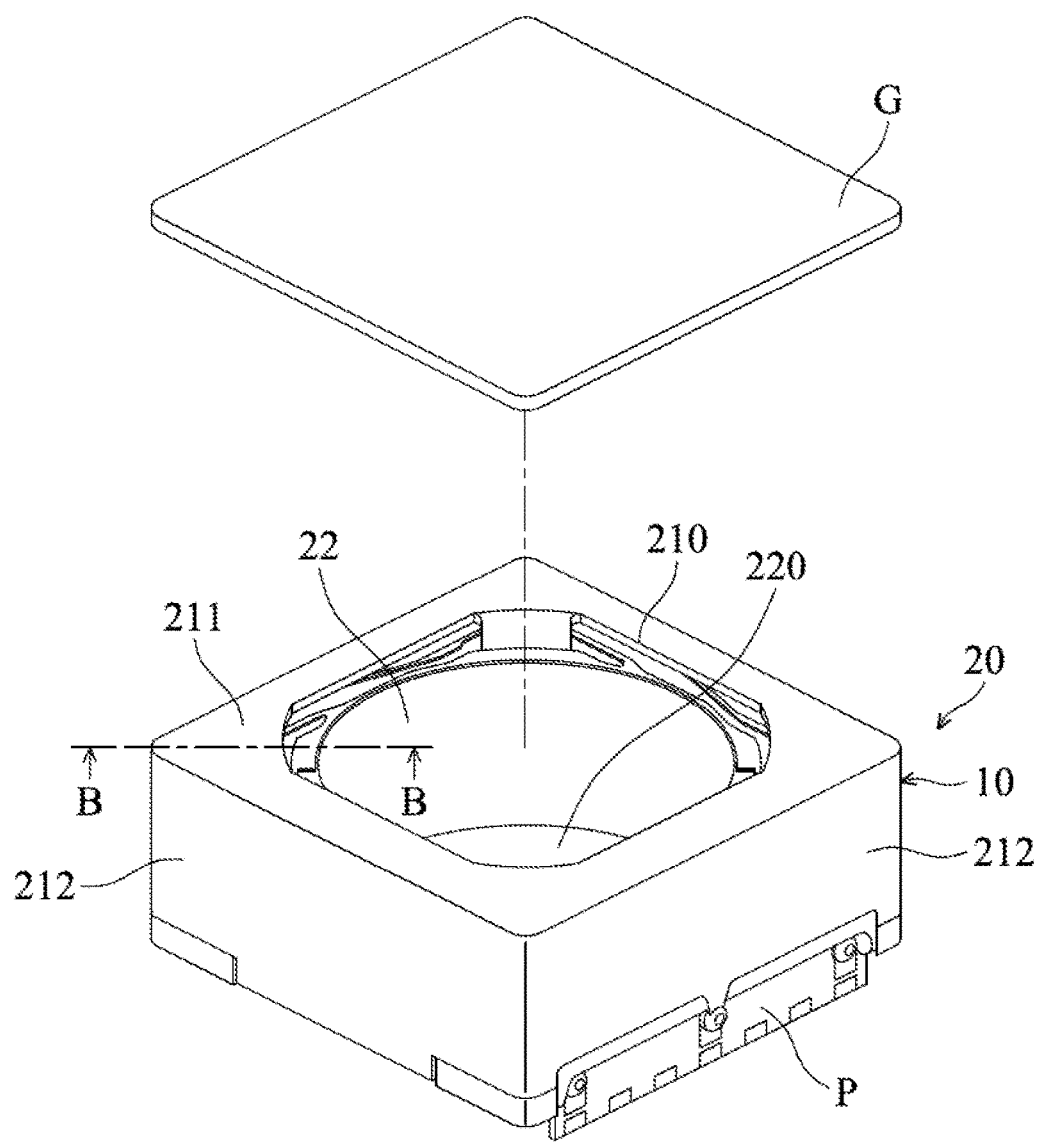
FIG. 3A is a perspective diagram of the lens driving mechanism in FIG. 2 with a transparent plate and a circuit board connected thereto.
Figure 3B:
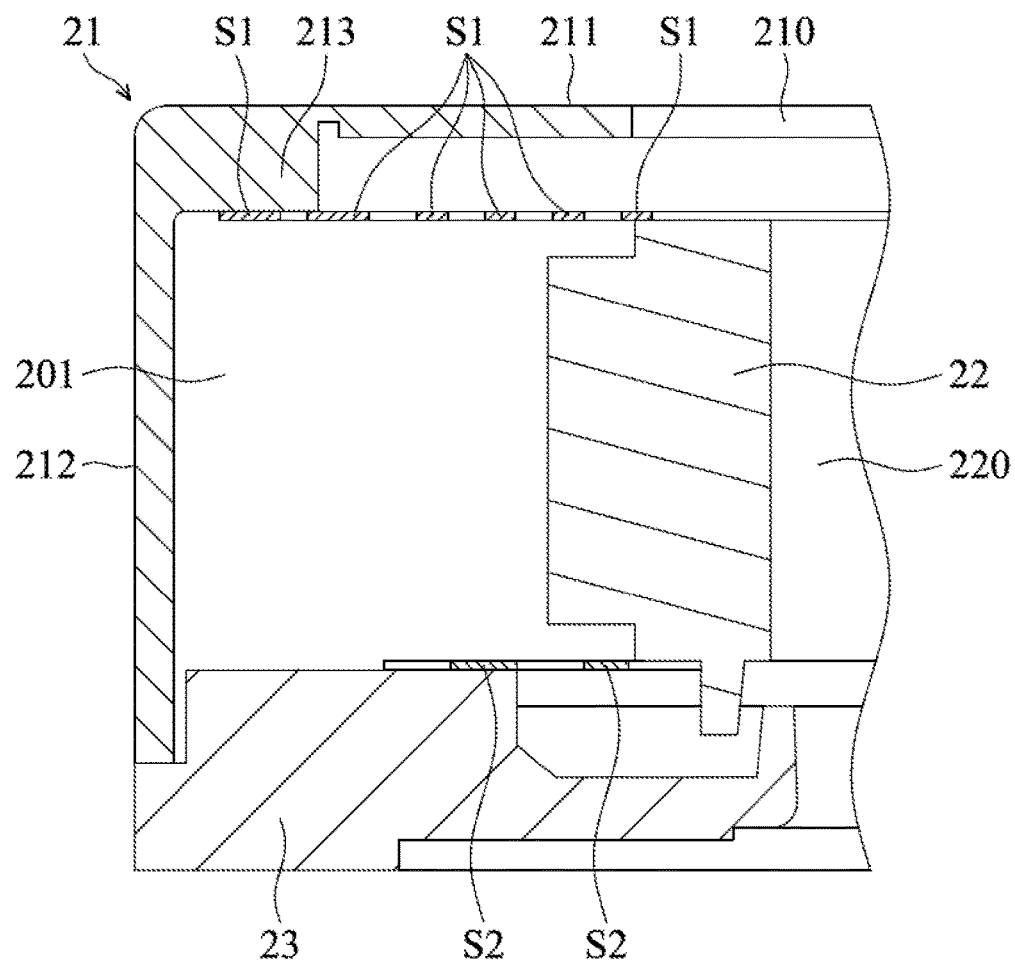
FIG. 3B is a cross-sectional view along line B-B in FIG. 3A.

Referring to FIGS. 2, 3A, and 3B, FIG. 3A is a perspective diagram of the lens driving mechanism 20 in FIG. 2 with a transparent plate G and a circuit board P assembled thereto, and FIG. 3B is a cross-sectional view along line B-B in FIG. 3A. As shown in FIG. 3A, a transparent plate G (such as plastic or glass plate) is assembled to the lens driving mechanism 20. Here, the transparent plate G is adhered to a flat top surface 211 of the frame 21, so as to protect the lens unit and other components in the lens driving mechanism 20, and allow light to enter the lens driving mechanism 20 through the transparent plate G. Therefore, an image sensor (such as CCD) can receive and transfer light into electronic signals. The lens driving mechanism 20 may be electrically connected to an external power source via the circuit board P. Moreover, the lens driving mechanism 20 may transmit electronic signals to a processor outside of the driving mechanism 20 via the circuit board P for data processing.

In FIGS. 2 and 3B, the lens holder 22 and the upper and lower spring sheets S1 and S2 are all disposed in the space 201 which is formed between the frame 21 and the base 23. The upper spring sheet S1 connects the frame 21 to the lens holder 22, and the lower spring sheet S2 connects the base 23 to the lens holder 22. In this embodiment, as the frame 21 comprises plastic (pure plastic or metal-doped plastic material), it can be integrally formed in one piece by injection molding or insert molding. Specifically, at least a protrusion 213 is directly formed on an inner surface of the frame 21 (FIG. 3B), corresponding to an adjoining area (corner) between the top surface 211 and the side surfaces 212. Hence, the top surface 211 of the frame 21 can have a large and flat adhesion area to enhance the connection between the frame 21 and the transparent plate G. Additionally, as the protrusion 213 is located corresponding to the adjoining area between the top surface 211 and the side surfaces 212, the structural strength of the frame 21 can also be improved.

In some embodiments, as the frame 21 may comprise plastic material which is doped with metal particles, the intensity of the magnetic field within the lens driving mechanism 20 can be increased when compared with pure plastic material, and the structural strength thereof can also be improved when compared with metal plate which is formed by conventional stamping process. Moreover, as the frame 21 comprises plastic material and therefore can be integrally formed in one piece, electrical circuits can be directly formed on or in the frame 21 by Molded Interconnect Device (MID) or Laser Direct Structuring (LDS) technologies. Thus, additional electronic element (such as the circuit board P in FIG. 3A) for electrical connection to the external circuits can be omitted, so as to reduce production cost and the dimensions of the lens driving mechanism 20.

Figure 4A:
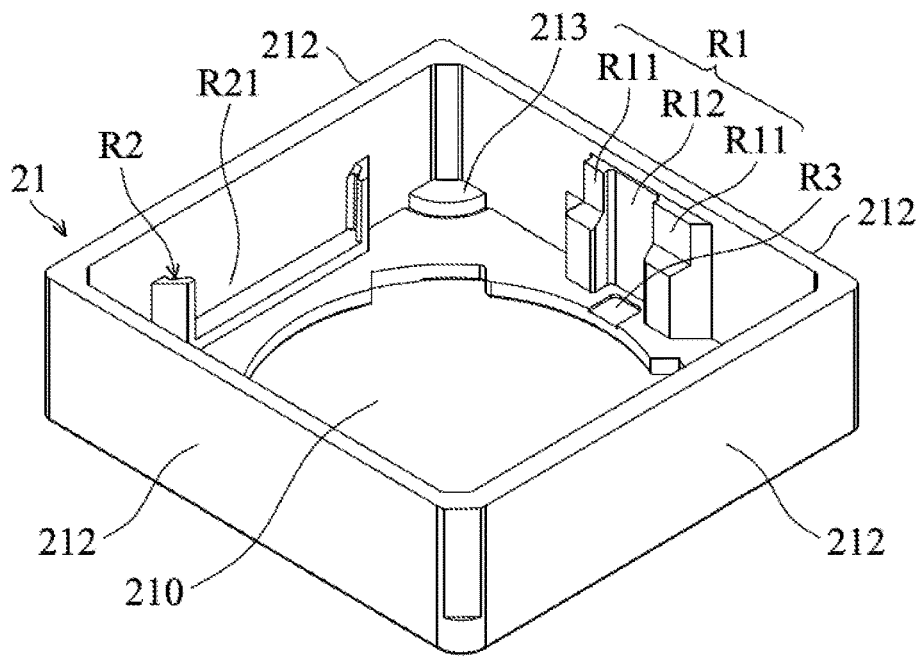
FIG. 4A is a perspective diagram of the frame in FIG. 3A.
Figure 4B:
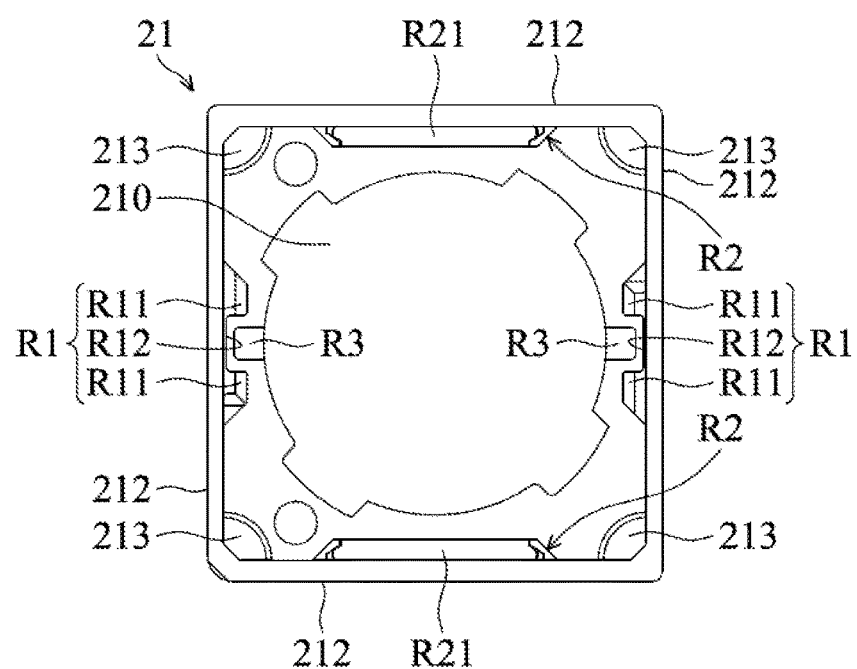
FIG. 4B is a top view of the frame in FIG. 4A.
Figure 5A:
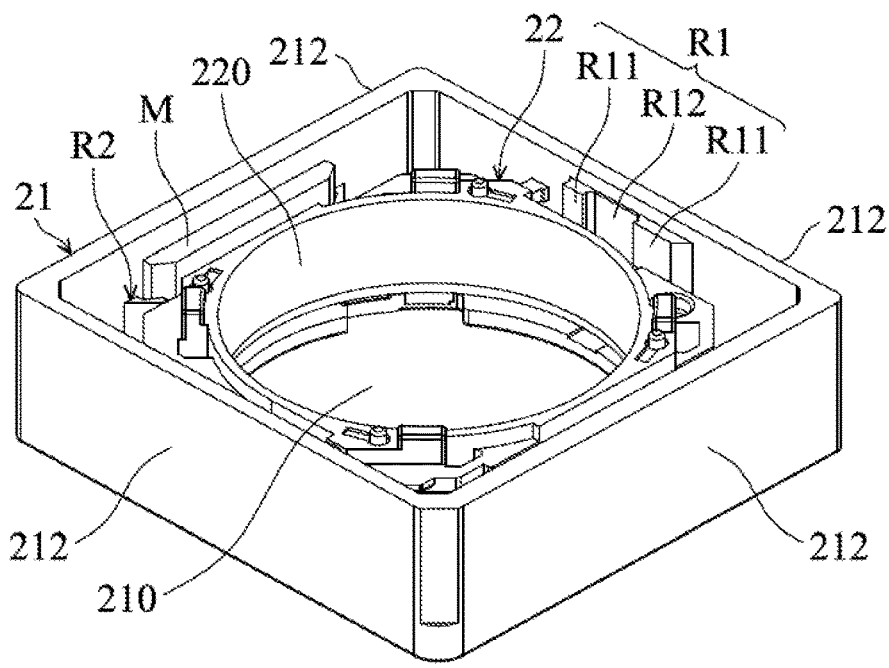
FIG. 5A is perspective diagram of the frame, the lens holder, and the first magnetic element when assembled to each other.
Figure 5B:
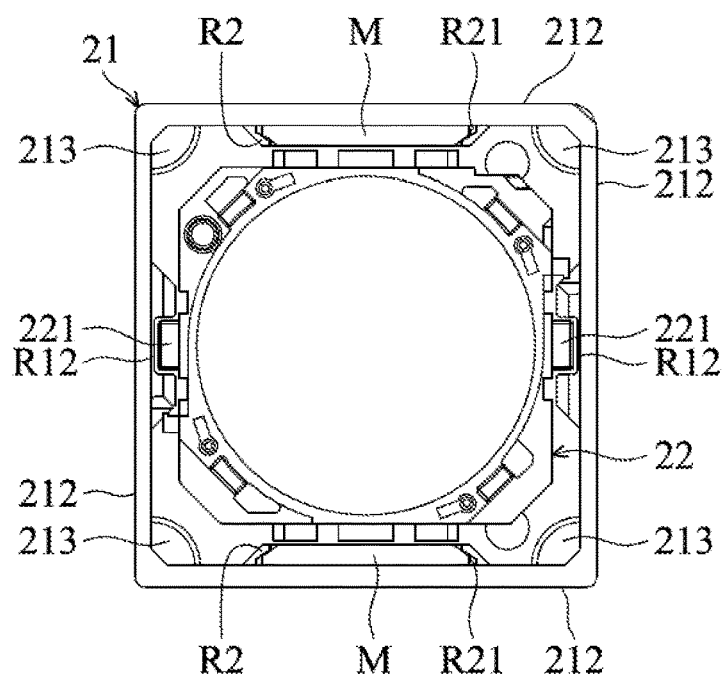
FIG. 5B is a top view of the frame, the lens holder, and the first magnetic element in FIG. 5A.

FIG. 4A is a perspective diagram of the frame 21 in FIG. 3A, and FIG. 4B is a top view of the frame 21 in FIG. 4A. FIG. 5A is a perspective diagram of the frame 21, the lens holder 22, and the first magnetic element M when assembled to each other, and FIG. 5B is a top view of the frame 21, the lens holder 22, and the first magnetic element M in FIG. 5A. As shown in FIGS. 2 and 4A-5B, at least one protruding slider 221 is formed on the outer surface of the lens holder 22, and at least one restricting structure R1 is formed on the inner surface of the frame 21, corresponding to the slider 221. Each restricting structure R1 has two restricting portions R11 protruding from the inner surface of the frame 21, wherein a longitudinal recess R12 extended along the light axis L is formed between the two restricting portions R11, and the width of the recess R12 exceeds that of the slider 221. In this embodiment, as the slider 221 is received in the restricting structure R1, it can be restricted from moving along horizontal directions, so as to prevent from collision with other components in the lens driving mechanism 20.

Still referring to FIGS. 2, and 4A-5B, at least a holding portion R2 protrudes from an inner surface of the frame 21 and forms a U-shaped structure. The first magnetic element M is received and held in a recess R21 at the center of the holding portion R2, so as to prevent the first magnetic element M being separated from the frame 21, and secure the first magnetic element M in a predetermined position on the inner surface of the frame 21. As the frame 21 in this embodiment comprises plastic material and therefore can be integrally formed in one piece, the restricting structure R1 and the holding portion R2 can be directly formed on the inner surface of the frame 21 for respectively retaining the lens holder 22 and the first magnetic element M, instead of using additional positioning components, thereby efficiently reducing the cost of materials and assembly.

Furthermore, as shown in FIGS. 2, and 4A-5B, the lens driving mechanism 20 forms a substantially quadrangular structure and includes two set of driving assemblies (each driving assembly has a first magnetic element M and a second magnetic element C). Those driving assemblies are disposed on opposite sides of the lens holder 22 for moving the lens holder 22 and the lens unit along the light axis L. Specifically, the slider 221 and the restricting structure R1 are located on a side of the lens driving mechanism 20 different from the driving assemblies. In this embodiment, the sliders 221 and the restricting structures R1 are disposed on the left and right sides of the lens holder 22 (FIG. 5B), different from the driving assemblies (first magnetic element M) disposed on the upper and lower sides of the lens holder 22.

Figure 6:
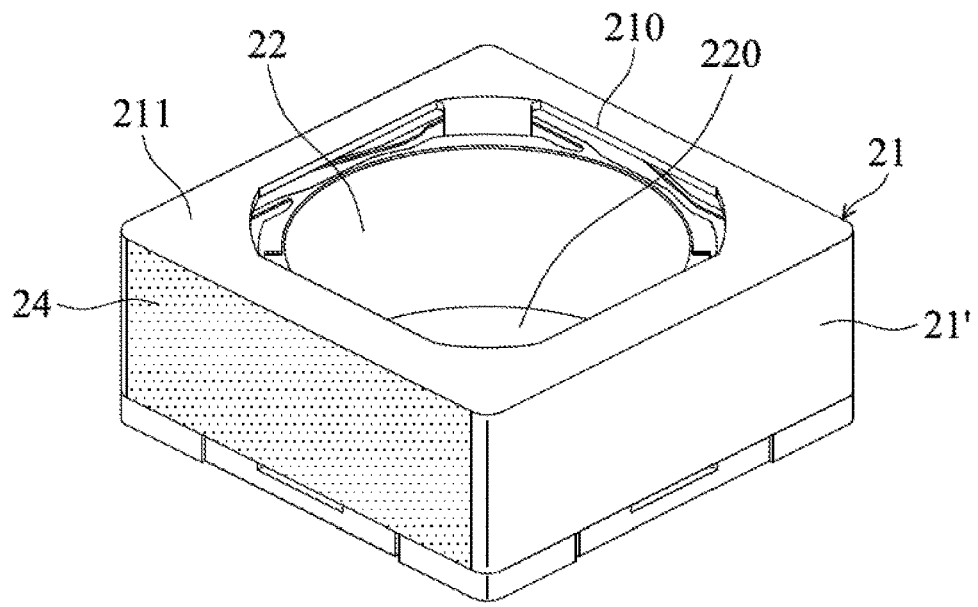
FIG. 6 perspective diagram of a lens driving mechanism according to another embodiment of the invention.

FIG. 6 illustrates a lens driving mechanism 20 according to another embodiment of the invention. As shown in FIG. 6, the frame 21 of the lens driving mechanism 20 has a hollow quadrangular main body 21' and a metal plate 24. The main body 21' comprises plastic material, and the metal plate 24 can be integrally formed on a side of the main body 21' by insert molding.

Figure 7:
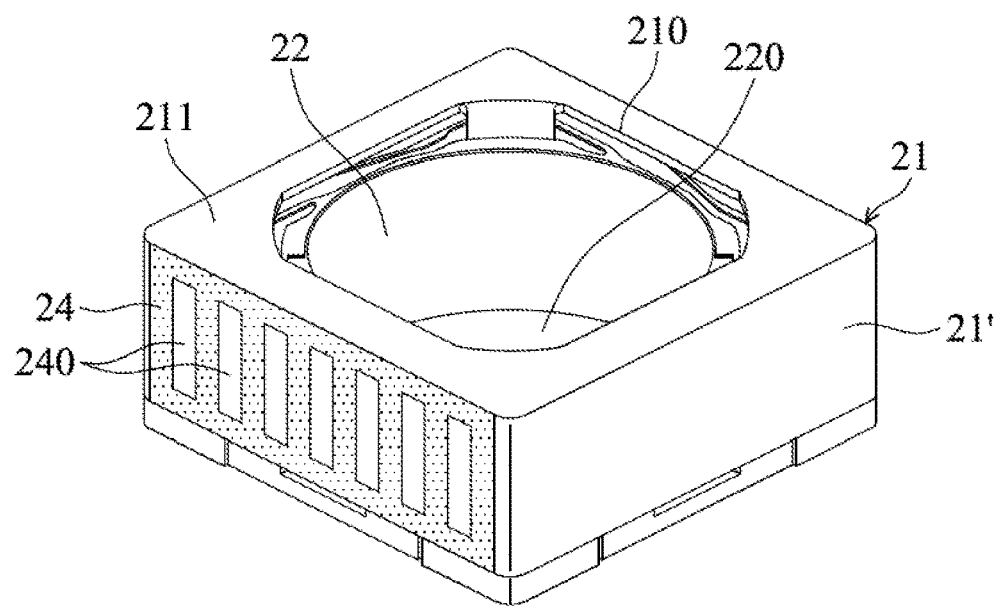
FIG. 7 perspective diagram of a lens driving mechanism according to another embodiment of the invention.

FIG. 7 illustrates a lens driving mechanism 20 according to another embodiment of the invention. The embodiment of FIG. 7 is different from the embodiment of FIG. 6 in that the metal plate 21 further forms a plurality of holes 240, and the main body 21' further forms a plurality of protruding portions respectively engaged in the holes 240.

According to the embodiments as described above, the invention further provides an electronic device that includes the lens driving mechanism 20 of any one of the foregoing embodiments, wherein the lens driving mechanism 20 may have a substantially polygonal structure. Specifically, the lens driving mechanism 20 and at least a wireless communicating element (such as antenna or wireless communication chip) are disposed in the housing of the electronic device, wherein the driving assembly is located adjacent to a first side of the lens driving mechanism 20 (such as the upper or lower side of the lens holder 22 in FIG. 5B), and the wireless communicating element is located adjacent to a second side of the lens driving mechanism 20 (such as the left or right side of the frame 21 in FIG. 5B).

In summary, the invention provides a lens driving mechanism and an electronic device having the same. As the frame of the lens driving mechanism comprises plastic material, it can be integrally formed in one piece, so as to greatly reduce the dimensions of the lens driving mechanism and production cost thereof. Moreover, even though the communication element (such as antenna or wireless communication chip) in the electronic device is close to the lens driving mechanism, the plastic material of the lens driving mechanism can reduce influence to the communication element, so as to facilitate miniaturization of the electronic device and ensure high performance of the communication element.

While the invention has been described by way of example and in terms of preferred embodiment, it is to be understood that the invention is not limited thereto. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A lens driving mechanism for moving a lens unit along a light axis, comprising:
   a frame, comprising plastic and having an opening and a holding portion integrally formed on an inner surface of the frame, wherein the holding portion has a U-shaped structure and forms two sidewalls extending along the light axis;
   a base, fixed to and in contact with the frame, wherein a space is formed between the base and the frame;
   a lens holder, movably disposed in the space for holding the lens unit, wherein an external light enters the space through the opening to the lens unit; and a driving assembly, including a first magnetic element and a second magnetic element respectively disposed on the frame and the lens holder, to impel the lens unit and the lens holder to move along the light axis, wherein the holding portion holds the first magnetic element in a predetermined position on the inner surface of the frame, and the first magnetic element is located between the two sidewalls.

2. The lens driving mechanism as claimed in claim 1, wherein the frame further has a protrusion, a top surface, and a side surface extended from an edge of the top surface and toward the base, wherein the protrusion protrudes from an inner surface of the frame and is located corresponding to an adjoining area between the top and side surfaces, to enhance the structural strength of the frame.

3. The lens driving mechanism as claimed in claim 2, wherein the top surface has a quadrangular shape.

4. The lens driving mechanism as claimed in claim 1, wherein the frame comprises metal.

5. The lens driving mechanism as claimed in claim 1, further comprising a conductive wire directly formed on or in the frame by Molded Interconnect Device (MID) technology.

6. The lens driving mechanism as claimed in claim 1, wherein the holding portion forms a U-shaped structure with the first magnetic element received therein.

7. The lens driving mechanism as claimed in claim 1, wherein the first magnetic element comprises a magnet, and the second magnetic element comprises a coil with an electrical current applied thereto.

8. The lens driving mechanism as claimed in claim 7, wherein the first magnetic element comprises a multipolar magnet.

9. The lens driving mechanism as claimed in claim 1, wherein the lens holder has a protruding slider, and the frame further has a restricting structure with the slider received therein to restrict movement of the slider.

10. The lens driving mechanism as claimed in claim 9, wherein the restricting structure has two restricting portions protruding from an inner surface of the frame, and a recess is formed between the two restricting portions and extended along the light axis, wherein the width of the recess exceeds that of the slider.

11. The lens driving mechanism as claimed in claim 9, wherein the lens driving mechanism has a substantially polygonal structure and further comprises two driving assemblies disposed on two opposite sides thereof to move the lens unit along the light axis, wherein the slider and the restricting structure are situated on a side of the lens driving mechanism different from the two opposite sides where the driving assemblies are disposed.

12. The lens driving mechanism as claimed in claim 1, wherein the frame forms a quadrangular shape and further has a plastic main body and a metal plate, the opening is formed on the main body, and the metal plate is disposed on a side of the main body.

13. The lens driving mechanism as claimed in claim 12, wherein the metal plate forms a plurality of holes, and the main body forms a plurality of protruding portions engaged in the holes.

14. An electronic device, comprising:
the lens driving mechanism as claimed in claim 1;
a housing; and
a wireless communicating element, wherein the lens driving mechanism has a substantially polygonal structure, and the lens driving mechanism and the wireless communicating element are disposed in the housing, wherein the driving assembly is adjacent to a first side of the lens driving mechanism, and the wireless communicating element is adjacent to a second side of the lens driving mechanism different from the first side.

* * * * *